(12) United States Patent
Kubota et al.

(10) Patent No.: US 9,718,324 B2
(45) Date of Patent: Aug. 1, 2017

(54) DAMPER CONTROL DEVICE

(71) Applicant: KAYABA INDUSTRY CO., LTD., Tokyo (JP)

(72) Inventors: Tomoo Kubota, Kanagawa (JP); Masatoshi Okumura, Gifu (JP)

(73) Assignee: KYB Corporation, Tokyo (JP)

( * ) Notice: Subject to any disclaimer, the term of this patent is extended or adjusted under 35 U.S.C. 154(b) by 11 days.

(21) Appl. No.: 14/780,027

(22) PCT Filed: Apr. 24, 2014

(86) PCT No.: PCT/JP2014/061636
§ 371 (c)(1),
(2) Date: Sep. 25, 2015

(87) PCT Pub. No.: WO2014/175406
PCT Pub. Date: Oct. 30, 2014

(65) Prior Publication Data
US 2016/0052360 A1 Feb. 25, 2016

(30) Foreign Application Priority Data
Apr. 25, 2013 (JP) ................................. 2013-091885

(51) Int. Cl.
*B60G 17/018* (2006.01)
*B60G 17/08* (2006.01)

(52) U.S. Cl.
CPC .......... *B60G 17/018* (2013.01); *B60G 17/08* (2013.01); *B60G 2400/252* (2013.01); *B60G 2500/11* (2013.01)

(58) Field of Classification Search
CPC B60G 17/018; B60G 17/08; B60G 2400/252; B60G 2500/11; B60G 17/00
See application file for complete search history.

(56) References Cited

U.S. PATENT DOCUMENTS

| 5,712,783 A * | 1/1998 | Catanzarite .......... B60G 17/015 180/378 |
| 2005/0113997 A1* | 5/2005 | Kim .................... B60G 17/0165 701/37 |

(Continued)

FOREIGN PATENT DOCUMENTS

| JP | 2005-075238 A | 3/2005 |
| JP | 2007-210590 A | 8/2007 |

(Continued)

*Primary Examiner* — Genna Mott
(74) *Attorney, Agent, or Firm* — Rabin & Berdo, P.C.

(57) ABSTRACT

A damper control device includes a speed conversion unit configured to convert a damper speed to a control damper speed, and if the damper is accelerating, the damper speed is converted so that signs of the control damper speed and the damper speed accord with each other and an absolute value of the control damper speed becomes an absolute value of the damper speed or more, and if the damper is decelerating, the damper speed is converted so that the signs of the control damper speed and the damper speed accord with each other and the absolute value of the control damper speed becomes the absolute value of the damper speed or less, and a damping force of the damper is controlled by using the control damper speed.

10 Claims, 12 Drawing Sheets

(56) References Cited

U.S. PATENT DOCUMENTS

| | | | | |
|---|---|---|---|---|
| 2005/0113998 | A1* | 5/2005 | Kim | B60G 17/018 |
| | | | | 701/37 |
| 2006/0224286 | A1* | 10/2006 | Izawa | B60G 17/0165 |
| | | | | 701/37 |
| 2008/0009992 | A1* | 1/2008 | Izawa | B60G 17/08 |
| | | | | 701/37 |
| 2008/0140285 | A1* | 6/2008 | Sekiya | B60G 17/018 |
| | | | | 701/38 |
| 2009/0292419 | A1* | 11/2009 | Itagaki | B60G 17/08 |
| | | | | 701/40 |
| 2010/0204885 | A1* | 8/2010 | Kajino | B60G 17/0157 |
| | | | | 701/37 |
| 2011/0127127 | A1* | 6/2011 | Hirao | B60G 17/08 |
| | | | | 188/266.2 |
| 2012/0004806 | A1* | 1/2012 | Hozumi | B60G 17/08 |
| | | | | 701/37 |
| 2012/0013277 | A1* | 1/2012 | Ogawa | B60G 17/08 |
| | | | | 318/368 |

FOREIGN PATENT DOCUMENTS

| | | |
|---|---|---|
| JP | 2009-132237 A | 6/2009 |
| JP | 2011-230718 A | 11/2011 |

\* cited by examiner

DAMPER CONTROL DEVICE

TECHNICAL FIELD

The present invention relates to a damper control device.

BACKGROUND ART

In a damper control device for controlling a damping force of a damper interposed between a sprung member and an unsprung member of a vehicle, such a damper control device is known that whether the damper is decelerating or accelerating is determined on the basis of expansion/contraction displacement and an expansion/contraction speed (damper speed) of the damper, for example, and a control gain is changed between deceleration and acceleration (see JP2007-210590A).

In the above-described damper control device, during deceleration, flattering of the unsprung member is suppressed by increasing the control gain so as to allow the damper to exert a high damping force, while during acceleration, riding comfort in a vehicle is improved by decreasing the control gain so as to allow the damper to exert a low damping force and to improve a road-surface follow-up characteristic of the unsprung member.

That is, in the above-described damper control device, in a situation in which the damper accelerates and a damper speed rises, the damper is allowed to exert the low damping force, while in a situation in which the damper decelerates and the damper speed lowers, the damper is allowed to exert the high damping force.

SUMMARY OF INVENTION

Responsiveness of the damping force exerted by the damper when the damper is expanded/contracted has a time delay. Moreover, a gas is dissolved in operating oil filled in the damper, and the operating oil might exert elasticity in some cases. Thus, if the damper is continuously expanded/contracted, a damping force speed waveform of the damper has a hysteresis.

Particularly, if the damping force speed characteristic of the damper is such that, when the damper speed is low, a damping coefficient is high, while when the damper speed is high, the damping coefficient drops, a large hysteresis occurs in the damping force speed waveform of the damper as indicated by a broken line in FIG. 9.

If the damper is repeatedly expanded/contracted, if the damping force is controlled in a way as the above-described damper control device, a vehicle body is vibrated by a response delay of the damper particularly when an expansion/contraction direction is switched across the damper speed of 0, and there is a possibility that the riding comfort is lost.

Moreover, if the damping force is controlled relatively higher during traveling on a rough road or the like, the hysteresis becomes larger, and a change in the damping force becomes larger when the direction of the damping force is switched. Such a rapid change in the damping force of the damper applies vibration to the vehicle body and generates a noise in a cabin or gives a shock to the vehicle body. Thus, it causes a vehicle occupant to feel a sense of discomfort or deteriorates riding comfort in the vehicle.

The present invention has an object to provide a damper control device which can suppress occurrence of a hysteresis in a damping force of a damper and can improve riding comfort in a vehicle.

According to one aspect of the present invention, a damper control device for controlling a damping force of a damper on the basis of a damper speed, the damper being interposed between a sprung member and an unsprung member in a vehicle, the damper control device includes a speed conversion unit configured to convert the damper speed to a control damper speed, wherein if the damper is accelerating, the speed conversion unit converts the damper speed so that signs of the control damper speed and the damper speed accord with each other and an absolute value of the control damper speed becomes an absolute value of the damper speed or more, while if the damper is decelerating, the damper speed is converted so that the signs of the control damper speed and the damper speed accord with each other and the absolute value of the control damper speed becomes the absolute value of the damper speed or less, and the damping force of the damper is controlled by using the control damper speed acquired in the speed conversion unit.

DESCRIPTION OF EMBODIMENTS

Figure 1:
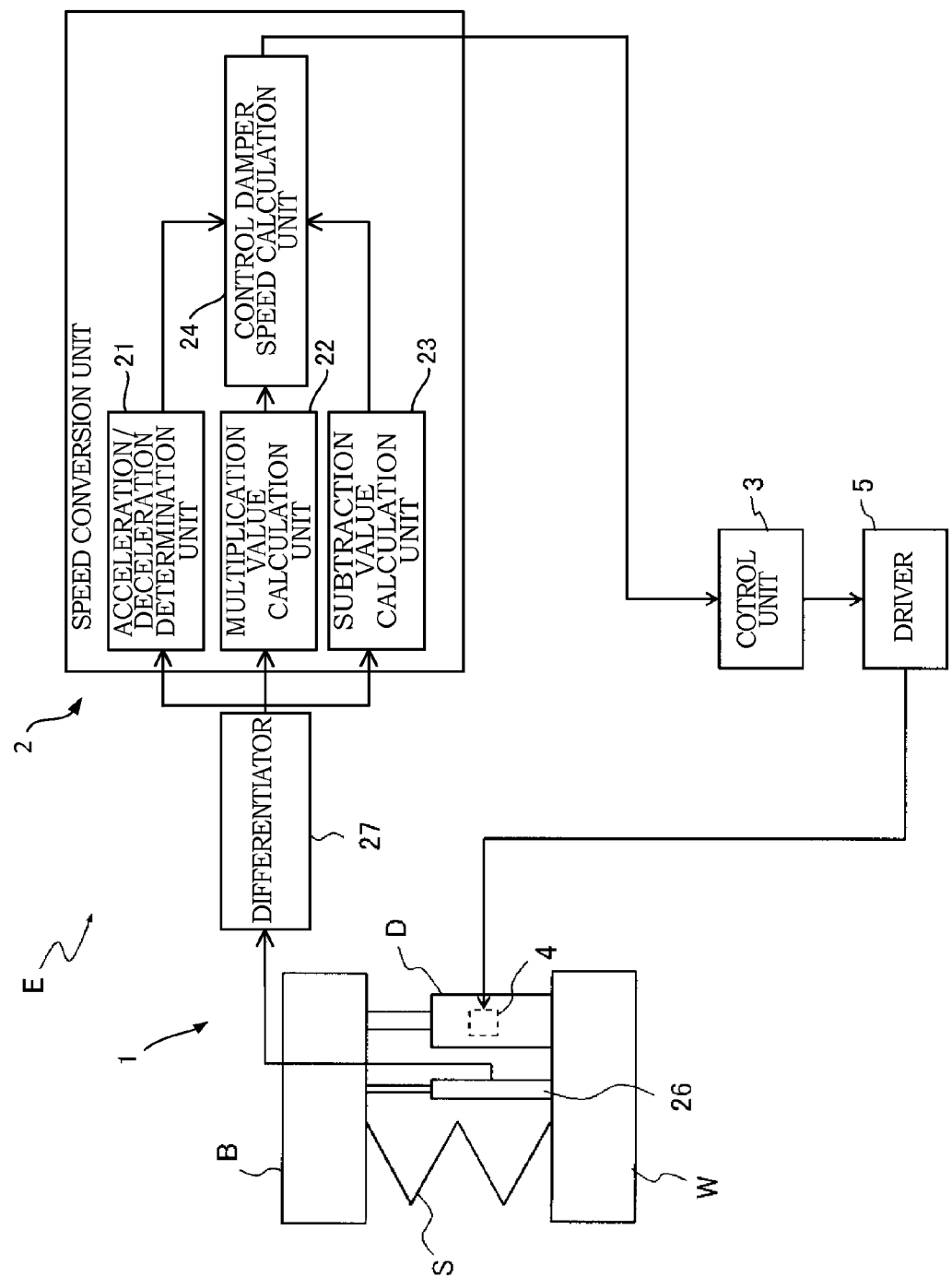
FIG. 1 is a diagram illustrating an outline configuration of a damper control device according to an embodiment of the present invention.

An embodiment of the present invention will be explained below by referring to the attached drawings.

A damper control device E is configured to control a damping force of a damper D interposed between a sprung member B and an unsprung member W in a vehicle. The damper control device E includes a speed detection unit 1 for detecting a damper speed Vd, a speed conversion unit 2 for converting the damper speed Vd to a control damper speed Vc, and a control unit 3 for controlling the damping force of the damper D by using the control damper speed Vc.

The speed detection unit 1 includes a stroke sensor 26 for detecting damper displacement X which is a stroke of the damper D and a differentiator 27 for calculating the damper speed Vd of the damper D by differentiating the damper displacement X detected by the stroke sensor 26.

The speed conversion unit 2 includes an acceleration/deceleration determination unit 21 for determining whether the damper D is accelerating or decelerating, a multiplication value calculation unit 22 for acquiring a multiplication value k by which the damper speed Vd is to be multiplied, a subtraction value calculation unit 23 for acquiring a subtraction value δ to be subtracted from the damper speed Vd, and a control damper speed calculation unit 24 for acquiring the control damper speed Vc on the basis of a determination result of the acceleration/deceleration determination unit 21.

Figure 2:
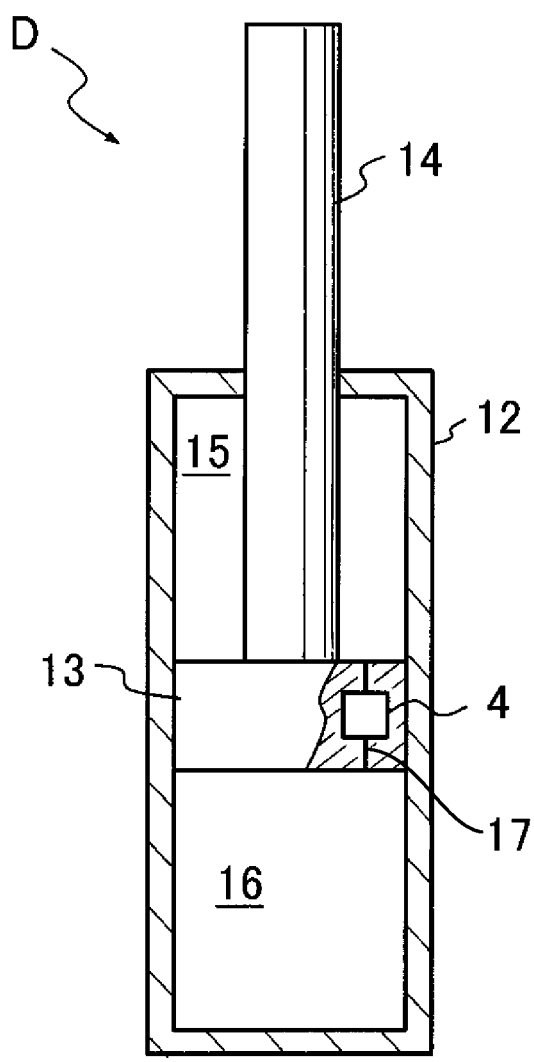
FIG. 2 is an outline longitudinal sectional view of a damper.

The damper D is a fluid pressure damper constituted by including, as illustrated in FIG. 2, for example, a cylinder 12, a piston 13 to be slidably inserted into the cylinder 12, a piston rod 14 movably inserted into the cylinder 12 and connected to the piston 13, two pressure chambers 15 and 16 defined by the piston in the cylinder 12, a passage 17 allowing the pressure chambers 15 and 16 to communicate with each other, and a damping force adjustment unit 4 for applying resistance to a flow of an operating oil as an operating fluid passing through the passage 17.

The damper D is interposed in parallel with a suspension spring S between the sprung member B and the unsprung member W. The damper D exerts a damping force for suppressing an expansion/contraction operation by applying resistance to the flow of the operating oil by the damping force adjustment unit 4 when the operating oil filled in the pressure chambers 15 and 16 passes through the passage 17 in response to the expansion/contraction operation. As a result, relative movement of the sprung member B and the unsprung member W is suppressed.

For the operating fluid, water, an aqueous solution, and a gas can be used in addition to the operating oil. If the operating fluid is a liquid and the damper D is a single-rod damper, the damper D is provided with a gas chamber or a reservoir for compensating for a volume by which the piston rod 14 goes in/out in the cylinder 12. If the operating fluid is a gas, the gas chamber or the reservoir does not have to be provided.

Moreover, if the damper D is provided with the reservoir and is a uniflow damper in which the operating fluid is discharged through the passage leading to the reservoir from an inside of the cylinder 12 whether the damper D is expanded or contracted, the damping force adjustment unit 4 may be provided in the middle of the passage leading to the reservoir from the cylinder 12.

The damping force adjustment unit 4 is constituted by including, for example, a damping valve allowing a channel area of the passage 17 to be variable and a solenoid or an actuator capable of adjusting the channel area of the passage 17 by driving a valve body of the damping valve.

The damper D can adjust the channel area of the passage 17 by increasing/decreasing an electric current amount to be applied to the solenoid or the actuator and can change resistance to be applied to the flow of the operating oil passing through the passage 17. As a result, the damping force generated by the damper D can be adjusted.

If the stroke speed of the damper D is not changed, if the electric current amount to be applied to the damping force adjustment unit 4 is increased, the damping force is also made larger. That is, the damping force adjustment unit 4 adjusts the damping force generated by the damper D by adjusting the damping coefficient.

The above-described configuration of the damping force adjustment unit 4 is an example. If the damper D is constituted by filling an electric viscous fluid or a magnetic viscous fluid in the pressure chambers 15 and 16, for example, it is only necessary that a device which can cause an electric field or a magnetic field to act is incorporated as the damping force adjustment unit 4 in the passage 17 instead of the damping valve.

In this case, the generated damping force of the damper D can be made variable by changing viscosity of a fluid flowing through the passage 17 through adjustment of the size of the electric field or the magnetic field by an electric current or a voltage applied from the damper control device E.

Moreover, if the damper D uses the electric viscous fluid, the damping coefficient is adjusted by the size of the electric field to be applied to the passage 17 and thus, control is executed by increasing/decreasing the voltage to be applied to the damping force adjustment unit 4. Thus, it is only necessary that the control unit 3 acquires a voltage value as a control command value and applies a voltage according to the voltage value to the damping force adjustment unit 4.

The damper D may be constituted other than the above as an electromagnetic damper exerting a damping force for suppressing relative movement of the sprung member B and the unsprung member W by an electromagnetic force. The electromagnetic damper is constituted by including, for example, a motor and a motion conversion mechanism for converting a rotary motion of the motor to a linear motion or constituted as a linear motor. If the damper D is the electromagnetic damper, it is only necessary that the damping force adjustment unit 4 is a motor driving device configured to adjust an electric current flowing through the motor or the linear motor.

Figure 4:
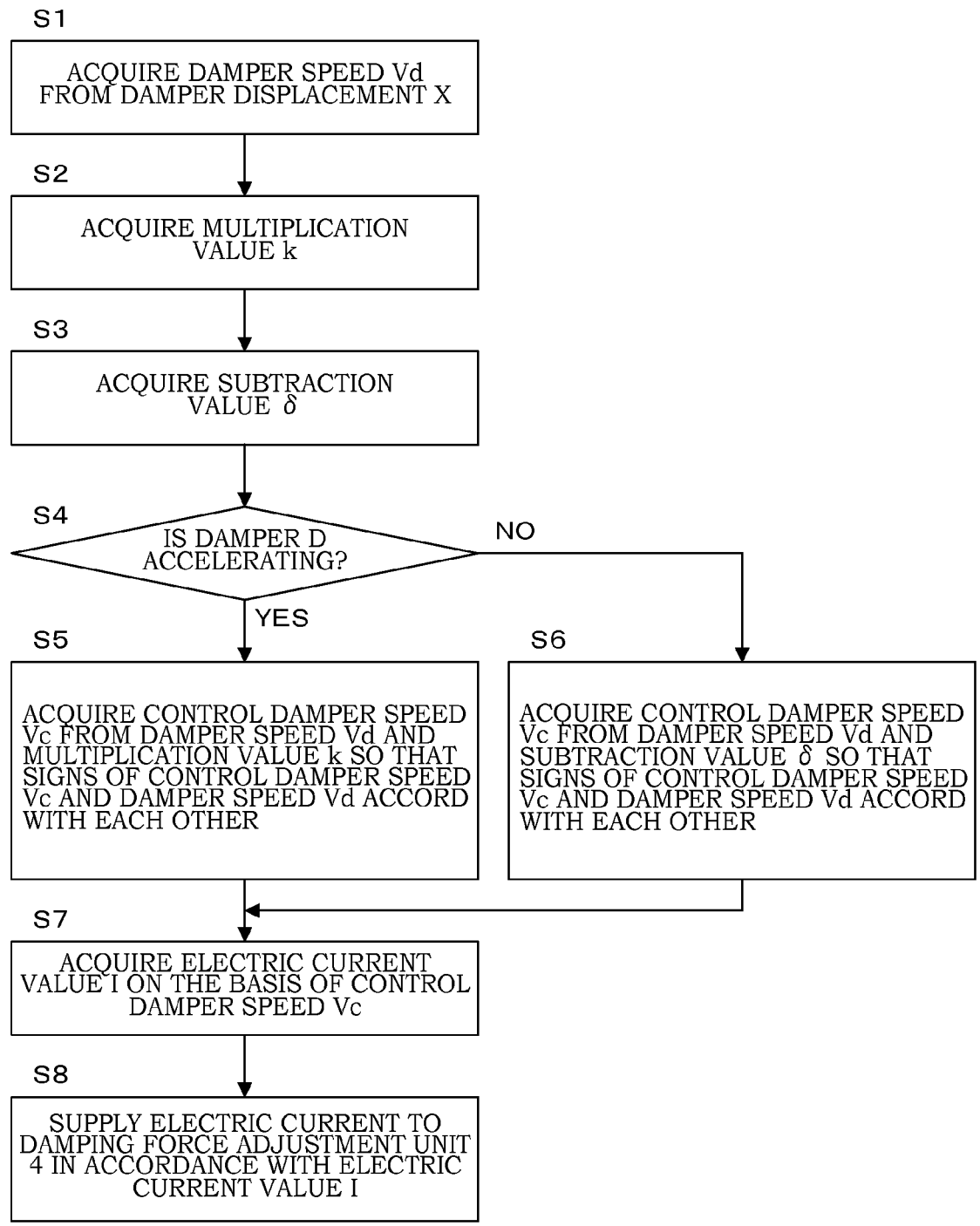
FIG. 4 is a flowchart illustrating a procedure of control executed by the damper control device.

Subsequently, control executed by the damper control device E will be explained by referring to a flowchart in FIG. 4.

First, the damper control device E acquires the damper speed Vd by differentiating the damper displacement X detected by the stroke sensor 26 by the differentiator 27 in the speed detection unit 1 (S1).

The speed detection unit 1 inputs the detected damper speed Vd into the speed conversion unit 2. The speed detection unit 1 is configured to detect the damper speed Vd with a direction in which the damper D is expanded as positive and a direction in which the damper D is contracted to the contrary as negative.

Subsequently, the damper control device E acquires damper acceleration α from the damper acceleration Vd acquired at S1 and acquires the multiplication value k from the damper acceleration α in the multiplication value calculation unit 22 (S2).

Figure 5:
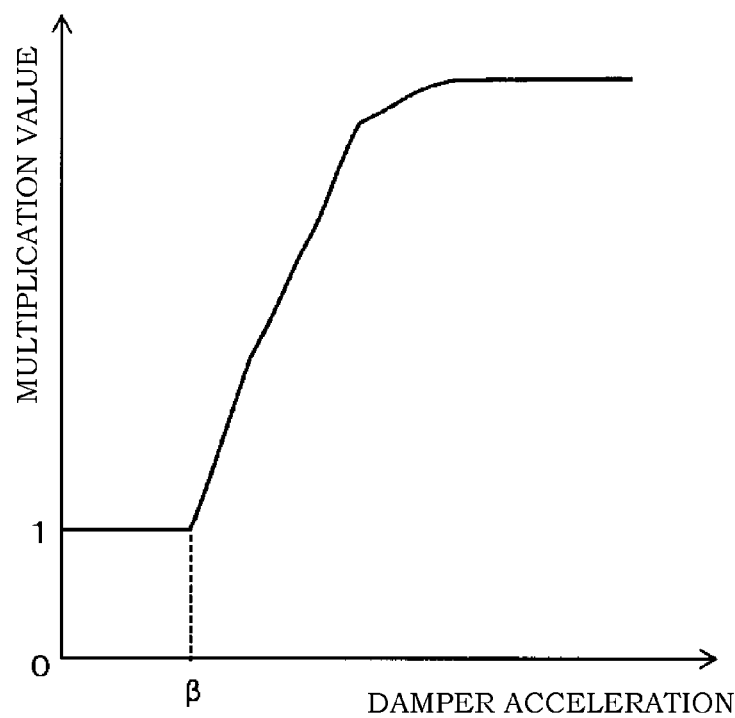
FIG. 5 is an example of a map in a multiplication value calculation unit.

The multiplication value calculation unit 22 holds a map on a relationship between an absolute value of the damper acceleration α and the multiplication value k by which the damper speed Vd is to be multiplied as illustrated in FIG. 5. The multiplication value calculation unit 22 acquires the multiplication value k by map calculation using the absolute value of the damper acceleration α as a parameter.

As illustrated in FIG. 5, the multiplication value k is set so that if the absolute value of the damper acceleration α becomes larger, the multiplication value k also becomes larger with a lower limit value at 1. Though the details will be described later, if the acceleration/deceleration determination unit 21 determines that the damper D is accelerating, the damper speed Vd is multiplied by the multiplication value k acquired in the multiplication value calculation unit 22 so as to acquire the control damper speed Vc.

The above-described map can be arbitrarily set. However, it is set such that, if the absolute value of the damper acceleration α is a set value β or less, the multiplication value k takes a value of 1. Thus, in a situation in which the damper D is accelerating and the damper acceleration α takes a value close to 0, that is, a change rate of the speed of the damper D is small, the control damper speed Vc is configured to take a value close to the damper speed Vd. As a result, during acceleration of the damper D, the control damper speed Vc is configured to take a value of the damper speed Vd or more all the time.

A rising rate of the multiplication value k to the rise of the damper acceleration α can be set arbitrarily. By setting the rising rate of the multiplication value k empirically or experimentally so that the control damper speed Vc does not exceed a maximum value the damper speed Vd is expected to reach by vibration when the damper D is vibrated, the control damper speed Vc can be prevented from becoming too large with respect to the damper speed Vd.

Moreover, the set value β can be set arbitrarily or may be set to 0. In this case, it is only necessary to set the map so that the multiplication value k takes a value of 1 when the damper acceleration α is 0.

Subsequently, the damper control device E acquires the subtraction value δ from the absolute value of the damper acceleration α and the damper speed Vd in the subtraction value calculation units 23 (S3).

Figure 3:
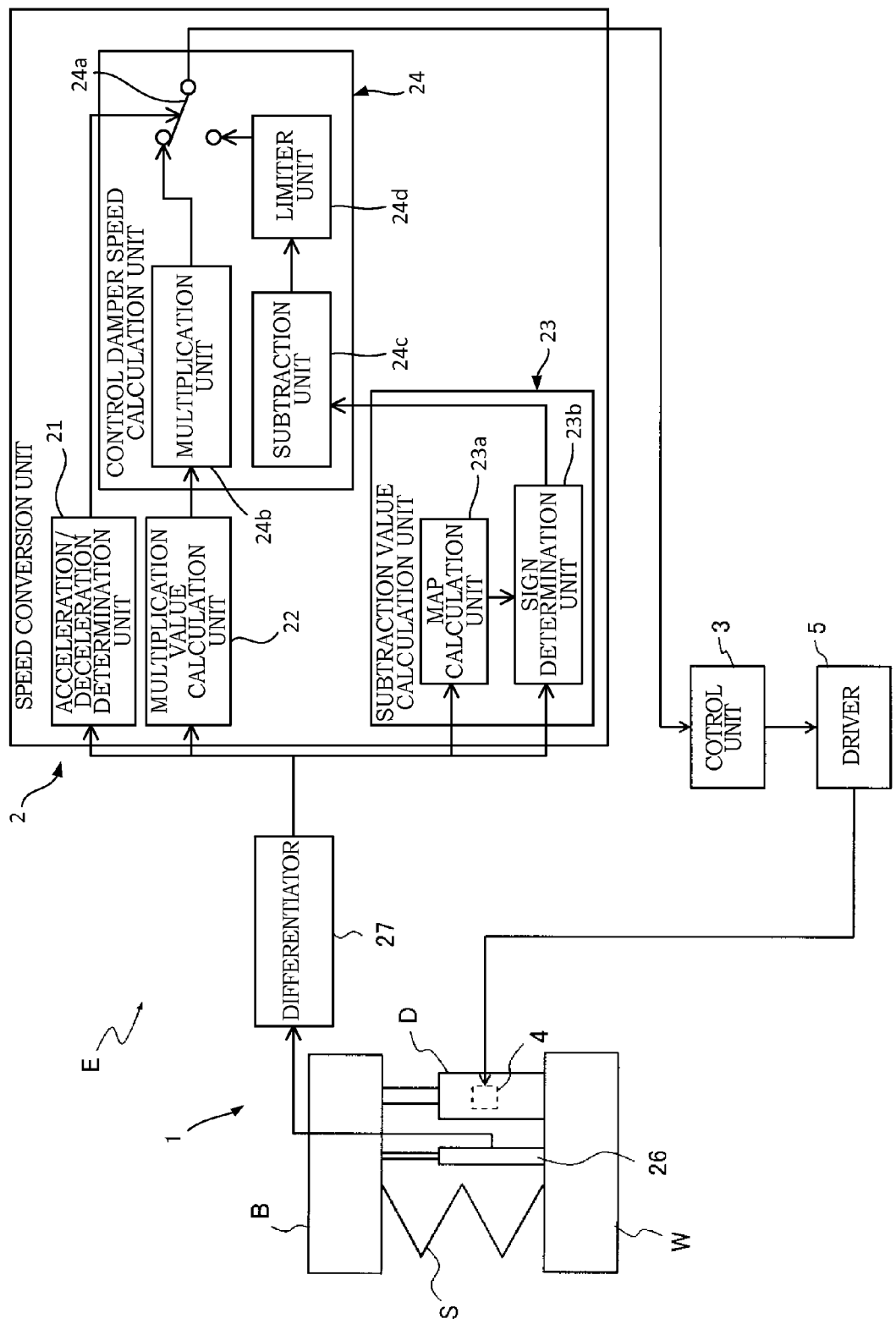
FIG. 3 is a diagram illustrating a specific configuration of the damper control device.

The subtraction value calculation unit 23 includes, specifically, as illustrated in FIG. 3, a map calculation unit 23a and a sign determination unit 23b for determining a sign of a provisional value acquired by the map calculation unit 23a and for acquiring the subtraction value δ based on the provisional value. The map calculation unit 23a holds a map on a relationship between the absolute value of the damper acceleration α and the provisional value. The provisional value is a numerical value required in acquiring the subtraction value δ to be subtracted from the damper speed Vd. The subtraction value calculation unit 23 acquires the provisional value by the map calculation using the absolute value of the damper acceleration α as a parameter.

Figure 6:
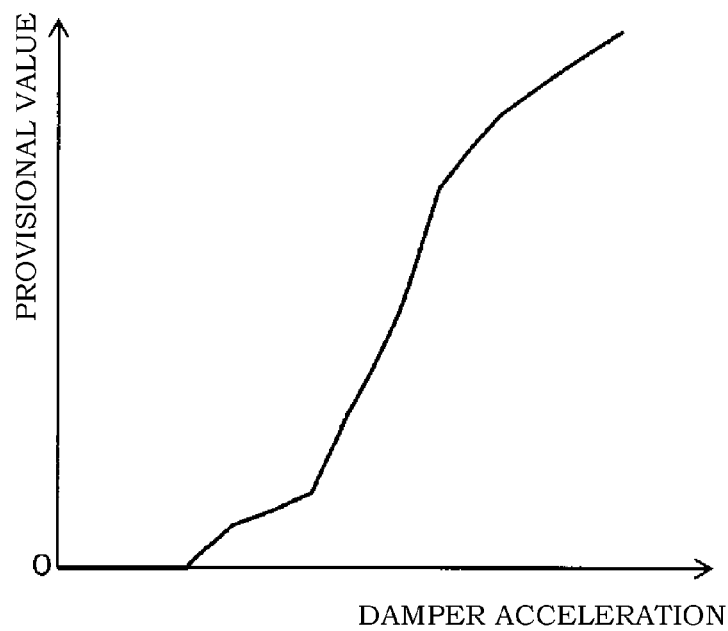
FIG. 6 is an example of a map in a subtraction value calculation unit.

In this case, the provisional value is set to take a positive value. Moreover, the map for acquiring the provisional value can be set arbitrarily. As illustrated in FIG. 6, it is set such that, if the absolute value of the damper acceleration α becomes larger, the provisional value also becomes larger.

The sign determination unit 23b acquires the subtraction value δ by multiplying 1 in order to make the sign of the provisional value positive, if the damper speed Vd is positive. If the damper speed Vd is negative, the subtraction value δ is acquired by multiplying −1 in order to make the sign of the provisional value negative.

Subsequently, the damper control device E determines whether the damper D is accelerating or decelerating from the sign of the damper speed Vd and the sign of the damper acceleration α in the acceleration/deceleration determination unit 21 (S4).

The state that the damper D is accelerating is a state in which a change rate of the absolute value of the damper speed Vd is positive, and the state that the damper D is decelerating is a state in which the change rate of the absolute value of the damper speed Vd is negative. That is, the acceleration/deceleration determination unit 21 determines that the damper D is accelerating in a situation in which the absolute value of the damper speed Vd is increasing over time and determines that the damper D is decelerating in a situation in which the absolute value of the damper speed Vd is decreasing over time.

If the damper speed Vd takes a positive value, the state that the damper D is accelerating is a state in which the value of the damper speed Vd is increasing, and the state in which the damper D is decelerating is a state in which the value of the damper speed Vd is decreasing. Moreover, if the damper speed Vd takes a negative value, the state in which the damper D is accelerating is a state in which the value of the damper speed Vd is increasing in a negative direction, and the state in which the damper D is decelerating is a state in which a value of the damper speed Vd is decreasing in a positive direction. Thus, whether the damper D is accelerating or decelerating can be determined from the sign of the damper speed Vd and the sign of the damper acceleration α.

Therefore, the acceleration/deceleration determination unit 21 specifically determines that the damper D is accelerating if a value of a product of the damper acceleration α acquired by differentiating the damper speed Vd and the damper speed Vd is positive and determines that the damper D is decelerating if the value of the product of the damper acceleration α and the damper speed Vd is negative.

Since the damper displacement X has a phase opposite to that of the damper acceleration α, whether the damper D is accelerating or decelerating can be also determined from the sign of the damper displacement X and the sign of the damper speed Vd. If the value of the above-described product is 0, it may be so configured that the damper D is determined to be accelerating or to be decelerating.

Specifically, if the value acquired by multiplying the damper speed Vd by the damper displacement X is a positive value, the damper D may be determined to be decelerating, while if the value is negative, the damper D may be determined to be accelerating. As described above, in the acceleration/deceleration determination unit 21, whether the damper D is accelerating or decelerating may be determined from the sign of the damper displacement X and the sign of the damper speed Vd.

In the damper control device E, if the damper D is determined to be accelerating at S4, the control damper speed Vc is acquired from the damper speed Vd and the multiplication value k acquired at S2 so that the signs of the control damper speed Vc and the damper speed Vd accord with each other in the control damper speed calculation unit 24 (S5). Moreover, if the damper D is determined to be decelerating at S4, the control damper speed Vc is acquired from the damper speed Vd and the subtraction value δ acquired at S3 so that the signs of the control damper speed Vc and the damper speed Vd accord with each other in the control damper speed calculation unit 24 (S6).

The control damper speed calculation unit 24 includes, specifically, as illustrated in FIG. 3, a multiplication unit 24b for multiplying the damper speed Vd by the multiplication value k, a subtraction unit 24c for subtracting the subtraction value δ from the damper speed Vd, a selection unit 24a for selecting either one of a path of the multiplication unit 24b and a path of the subtraction unit 24c in accordance with the determination result in the acceleration/deceleration determination unit 21, and a limiter unit 24d for outputting 0 if the sign of a value of the calculation result of the subtraction unit 24c does not accord with the sign of the damper speed Vd and for outputting the value of the calculation result of the subtraction unit 24c as it is if the signs accord with each other.

If the acceleration/deceleration determination unit 21 determines that the damper D is accelerating, the selection unit 24a selects the path of the multiplication unit 24b based on the determination result. The multiplication unit 24b outputs the control damper speed Vc by multiplying the damper speed Vd by the multiplication value k acquired in the multiplication value calculation unit 22. Moreover, if the acceleration/deceleration determination unit 21 determines that the damper D is decelerating, the selection unit 24a selects the path of the subtraction unit 24c based on the determination result. The subtraction unit 24c outputs a value acquired by subtracting the subtraction value δ from the damper speed Vd to the limiter unit 24d.

If the sign of the damper speed Vd and the sign of the value acquired by the calculation of the subtraction unit 24c are the same, the limiter unit 24d outputs the value as the control damper speed Vc as it is. Moreover, if the sign of the damper speed Vd is different from the sign of the value acquired by the calculation of the subtraction unit 24c, the control damper speed Vc is made 0 and outputted.

Figure 7:
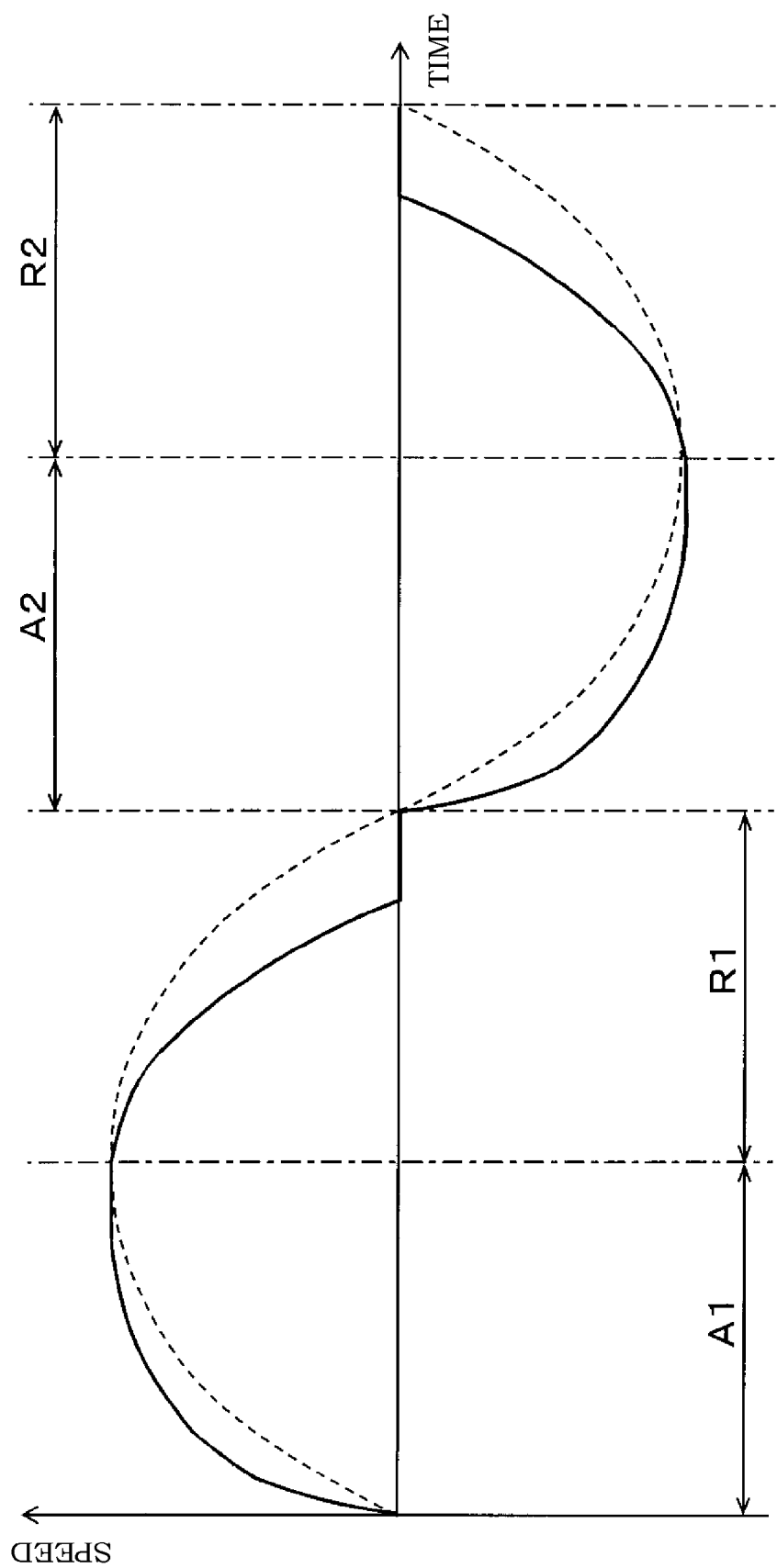
FIG. 7 is a diagram illustrating temporal changes of a damper speed and a control damper speed.

According to the above, as illustrated in FIG. 7, in regions A1 and A2 in which the damper D is accelerating, if the control damper speed Vc (solid line) becomes larger with respect to the damper speed Vd (broken line) and the change rate of the damper speed Vd becomes smaller, the control damper speed Vc and the damper speed Vd become substantially the same speed.

On the other hand, in regions R1 and R2 in which the damper D is decelerating, if the control damper speed Vc (solid line) becomes smaller with respect to the damper speed Vd (broken line) and the change rate of the damper speed Vd becomes smaller, the difference between the control damper speed Vc and the damper speed Vd becomes smaller.

Moreover, if the damper D is decelerating, since the control damper speed Vc is acquired by subtracting the subtraction value δ from the damper speed Vd, the control damper speed Vc becomes 0 earlier than the time when the damper speed Vd becomes 0. Then, if the sign of the damper speed Vd is different from the sign of the value acquired by the calculation of the subtraction unit 24c, the control damper speed Vc is limited to 0, and reversal of the direction of the control damper speed Vc to the direction of the damper speed Vd is prevented.

Thus, if the damper D is expanding, the control damper speed Vc converted from the damper speed Vd does not indicate contraction of the damper D. Moreover, if the damper D is contracting, the converted control damper speed Vc does not indicate expansion of the damper D.

By executing processing as above, in the damper control device E, if the damper D is accelerating, the speed conversion unit 2 converts the damper speed Vd to the control damper speed Vc so that the sign accords with that of the damper speed Vd and the absolute value becomes the absolute value of the damper speed Vd or more. Moreover, if the damper D is decelerating, the speed conversion unit 2 converts the damper speed Vd to the control damper speed Vc so that the sign accords with that of the damper speed Vd and the absolute value becomes the absolute value of the damper speed Vd or less.

Subsequently, in the damper control device E, in the control unit 3, the electric current value I as a control command value to be applied to the damping force adjustment unit 4 is acquired on the basis of the control damper speed Vc (S7).

The control unit 3 adjusts the damping coefficient of the damper D by the electric current amount to be supplied to the damping force adjustment unit 4 in this embodiment. A control command outputted by the control unit 3 is inputted to a driver 5 for supplying an electric current to a solenoid of the damping force adjustment unit 4.

Then, in the driver 5, the electric current is supplied to the damping force adjustment unit 4 in accordance with the electric current value I acquired at S7, and the damping force of the damper D is controlled (S8).

The driver 5 is provided with a PWM circuit or the like, for example, and is configured to be able to supply the electric current to the damping force adjustment unit 4 in accordance with the electric current value I inputted from the control unit 3.

Specifically, the control unit 3 has a plurality of maps of the electric current value I changing with the control damper speed Vc as a parameter in order to realize three damping characteristics, that is, soft, medium, and hard, for example. The control unit 3 selects the map on the basis of vibration strength of the unsprung member W in the vehicle and executes map calculation by using the control damper speed Vc. Then, in order that the electric current is to be outputted in accordance with the acquired electric current value I, a control command is outputted to the driver 5.

The vibration strength of the unsprung member W is a size of vibration of the unsprung member W. For example, it can be acquired by a length of a resultant vector of the damper acceleration α divided by a value of an angular frequency and the damper speed Vd or a length of a resultant vector of the damper displacement X multiplied by the value of the angular frequency and the damper speed Vd.

The map is set such that the larger the vibration strength becomes, the larger the damping force to the control damper speed Vc becomes, that is, the electric current value I becomes larger.

Figure 8:
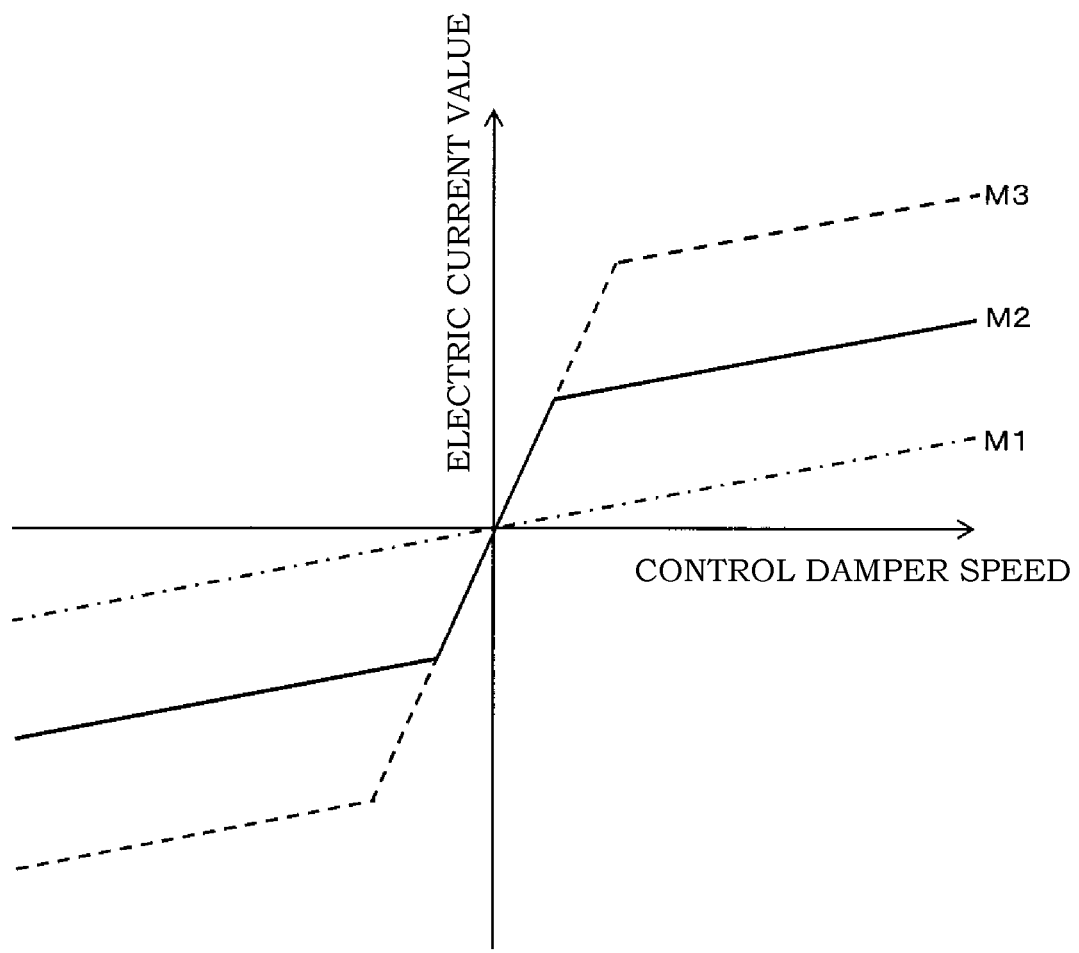
FIG. 8 is an example of a map for acquiring a current value to be applied to the damper on the basis of the control damper speed.

Specifically, as illustrated in FIG. 8, the vibration strength is classified into large, medium, and small in accordance with the size of the vibration strength, and a map corresponding to each classification is prepared. For example, if the vibration strength belongs to the small class, the control unit 3 selects a map corresponding to the small class, that is, a map M1 having a soft damping characteristic from a map group. Then, by using the selected map M1, the electric current value I which is a control command value is acquired by using the control damper speed Vc.

Moreover, if the vibration strength belongs to the medium class, the control unit 3 selects a map corresponding to the medium class, that is, a map M2 having the medium damping characteristic from the map group. Then, by using the selected map M2, the electric current value I which is a control command value is acquired by using the control damper speed Vc.

Moreover, if the vibration strength belongs to the large class, the control unit 3 selects a map corresponding to the large class, that is, a map M3 having the hard damping characteristic from the map group. Then, by using the selected map M3, the electric current value I which is a control command value is acquired by using the control damper speed Vc.

The above-described control procedure is an example, and the control unit 3 may generate a control command to be given to the driver 5 from the control damper speed Vc by employing skyhook control. In the skyhook control, Karnopp switching rules can be also used. The map calculation may be made in order to acquire a control command, and if the control command can be acquired without making the map calculation, the map calculation does not have to be made.

The damping force adjustment unit 4 adjusts the damping coefficient in the damper D upon receipt of supply of the electric current amount as the electric current value I from the driver 5. At this time, the damper D exerts the damping force according to the control damper speed Vc, not the damper speed Vd. As described above, the damping force of the damper D is controlled by the damper control device E.

As described above, if the damper D is accelerating, the damper control device E converts the damper speed Vd to the control damper speed Vc at the damper speed Vd or more. Then, it is configured such that the damping force of the damper D is controlled by the converted control damper speed Vc.

Regardless of a speed direction of the damper D, if the damper D is accelerating, the damper speed Vd is converted to the control damper speed Vc so that the sign accords with the sign of the damper speed Vd and also the absolute value becomes the absolute value of the damper speed Vd or more.

The control damper speed Vc after conversion changes as if its phase is advanced temporally with respect to the damper speed Vd. However, it does not change as if the phase has fully advanced with respect to the damper speed Vd but if the damper D is accelerating, it does not fall under the damper speed Vd until the damper acceleration α changes to decrease.

Moreover, regardless of the speed direction of the damper D, if the damper D is decelerating, the damper speed Vd is converted to the control damper speed Vc so that the sign accords with the sign of the damper speed Vd and also the absolute value becomes the absolute value of the damper speed Vd or less.

The control damper speed Vc after conversion changes as if its phase is advanced temporally with respect to the damper speed Vd. However, it does not change as if the phase has fully advanced with respect to the damper speed Vd but if the damper D is decelerating, it does not exceed the damper speed Vd until the damper acceleration α changes to increase.

Figure 9:
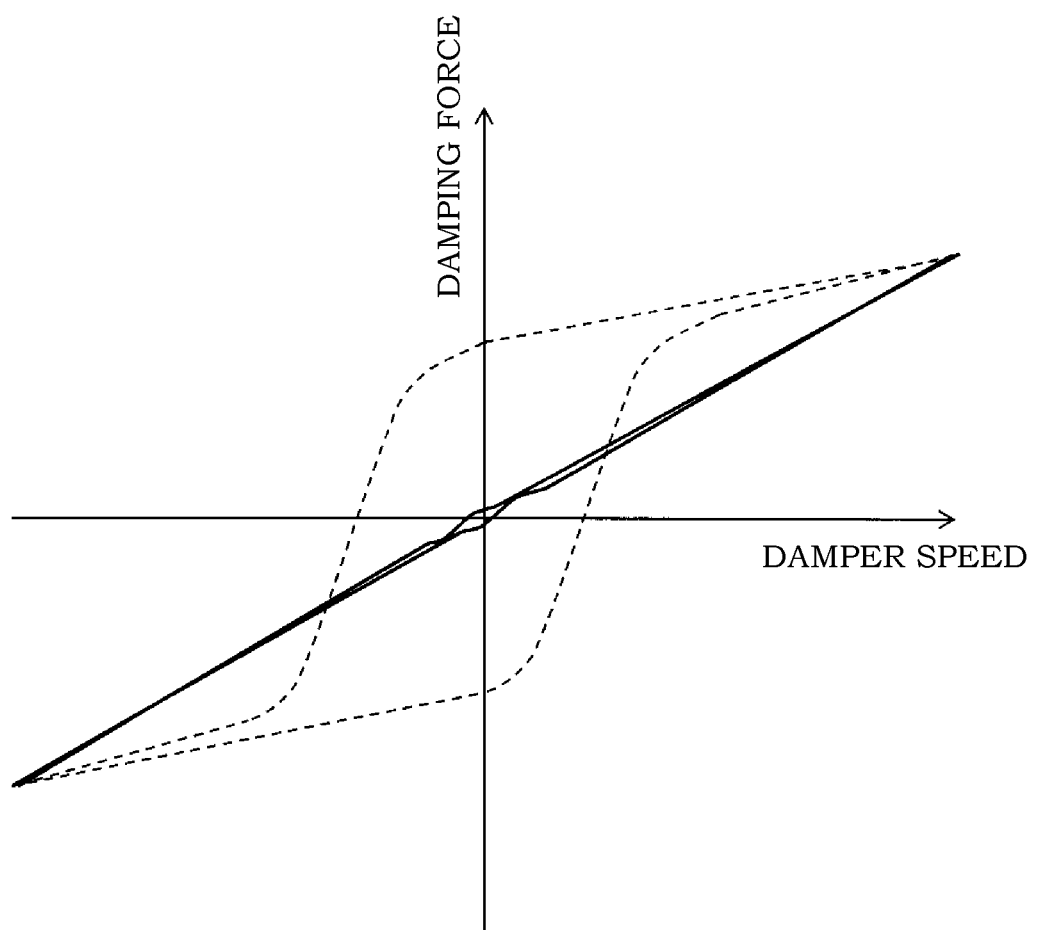
FIG. 9 is a diagram for explaining a damping force speed characteristic of the damper to which the damper control device according to the embodiment of the present invention is applied and a hysteresis occurring in the damping force speed characteristic caused by a damping force response delay of the damper.

Thus, by controlling the damping force of the damper D by using the control damper speed Vc, since the control damper speed Vc is advanced temporally with respect to the damper speed Vd which is an actual speed of the damper D, temporal delay in a damping force response of the damper D is offset. Therefore, as indicated by a solid line in FIG. 9, a hysteresis in the damping characteristic of the damper D (a characteristic of the damping force generated by the damper D with respect to the damper speed) can be made extremely small.

As described above, according to the damper control device E of this embodiment, occurrence of a hysteresis in the damping force of the damper D can be suppressed, and riding comfort in the vehicle can be improved.

Moreover, instead of simply advancing the phase of the control damper speed Vc with respect to the damper speed Vd, it is configured such that the speed directions of the control damper speed Vc and the damper speed Vd accord with each other all the time. Thus, when the damper D decelerates and the damper speed Vd gets close to 0, such a situation that the absolute value of the control damper speed Vc becomes larger with the sign of the control damper speed Vc reversed and the damping force generated by the damper D becomes larger can be prevented.

Therefore, according to the damper control device E of this embodiment, when the damper speed Vd gets close to 0 in deceleration, deterioration of the riding comfort in the vehicle caused by the increasing damping force can be also prevented.

The hysteresis of the damper D appears distinctively when the damping characteristic of the damper D is controlled so that the damping coefficient when the damper speed Vd is in a low-speed region becomes higher than the damping coefficient when it is in a high-speed region.

Therefore, the control by using the control damper speed Vc as above may be executed when the damper speed Vd is in the low-speed region and only if the damping force of the damper D is controlled so that the damping coefficient when the damper speed Vd is in the low-speed region becomes higher than the damping coefficient when it is in the high-speed region. By configuring as above, too, the hysteresis of the damper D can be made smaller.

Moreover, in this embodiment, the damper speed Vd is converted to the control damper speed Vc so that the larger the absolute value of the damper acceleration α is, the larger the difference between the damper speed Vd and the control damper speed Vc becomes. According to this, in a situation in which a speed change of the damper D is steep, the control damper speed Vc can be temporally advanced with respect to the damper speed Vd, and thus, the hysteresis of the damping force of the damper D can be reduced more effectively.

Furthermore, in deceleration of the damper D, the subtraction value δ is acquired, and the subtraction value δ is subtracted from the damper speed Vd. According to this, the control damper speed Vc can be brought to 0 temporally earlier than the time when the damper speed Vd becomes 0, and the hysteresis can be further reduced.

Embodiments of the present invention were described above, but the above embodiments are merely examples of applications of the present invention, and the technical scope of the present invention is not limited to the specific constitutions of the above embodiments.

Figure 10:
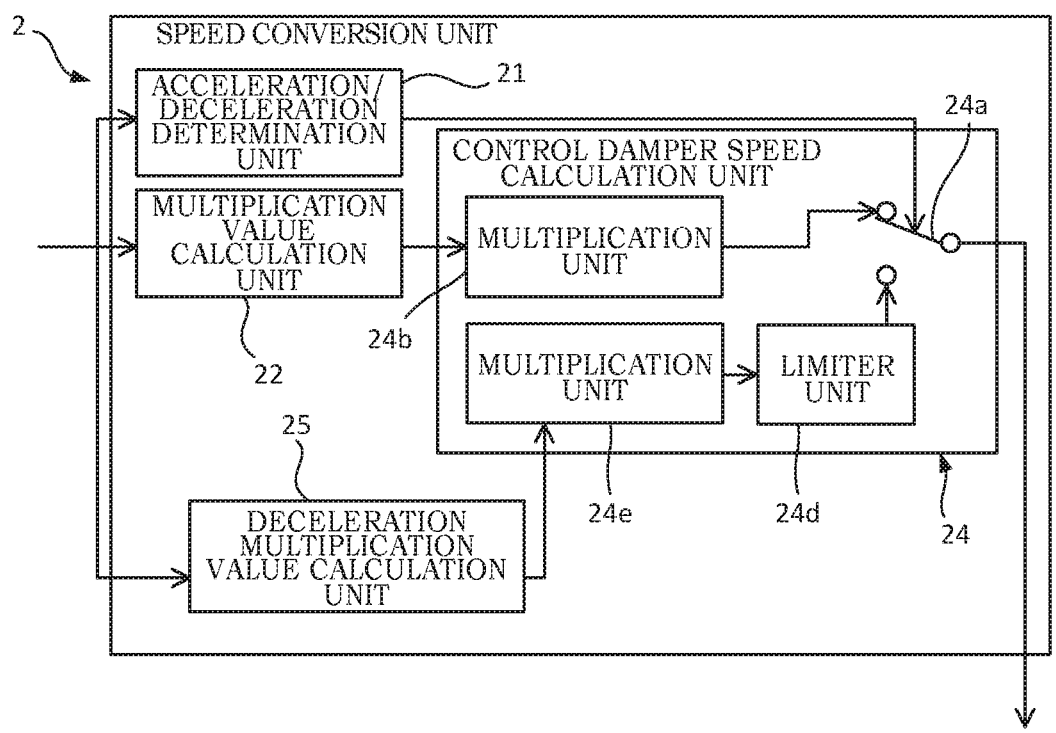
FIG. 10 is a diagram illustrating a variation of the damper control device.

For example, in the above-described embodiment, the control damper speed Vc is acquired by subtracting the subtraction value δ from the damper speed Vd in deceleration of the damper D, but as in the speed conversion unit 2 illustrated in FIG. 10, a deceleration multiplication value calculation unit 25 for acquiring a deceleration multiplication value j having a value of 0 and more and 1 and less is provided instead of the subtraction value calculation unit 23, a multiplication unit 24*e* for multiplying the damper speed Vd by the deceleration multiplication value j instead of the subtraction unit 24*c* is provided, and by multiplying the damper speed Vd by the deceleration multiplication value j, the control damper speed Vc can be also acquired.

Figure 11:
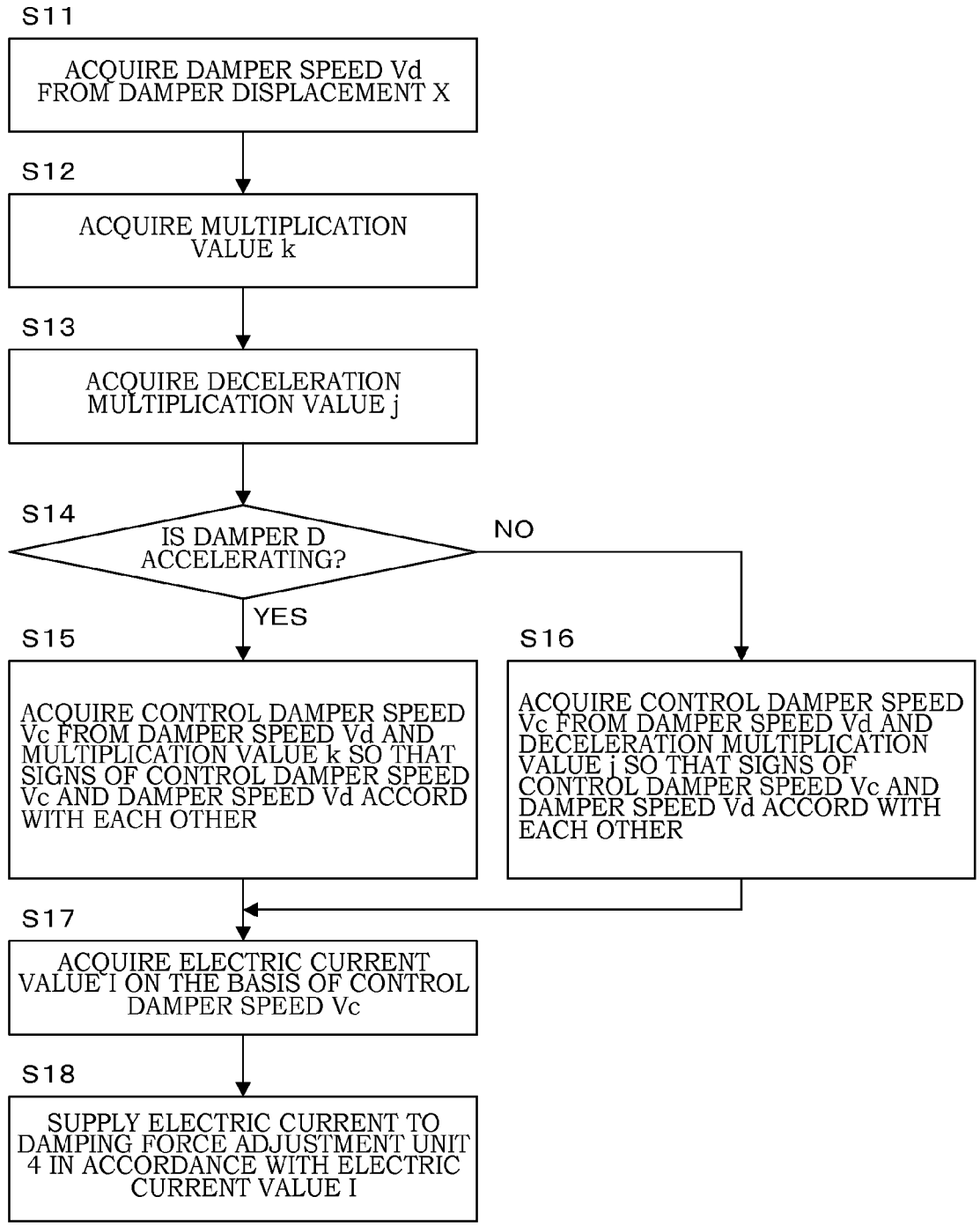
FIG. 11 is a flowchart illustrating a procedure of the control executed by the damper control device according to the variation.

In this case, the damper control device E executes control in a procedure illustrated in a flowchart in FIG. 11.

Specifically, first, the damper control device E acquires the damper speed Vd and the multiplication value k similarly to S1 and S2 in the above-described embodiment (S11, S12).

Subsequently, the damper control device E acquires the deceleration multiplication value j from the damper speed Vd in the deceleration multiplication value calculation unit 25 (S13).

Subsequently, the damper control device E determines whether the damper D is accelerating or decelerating similarly to S4 in the above-described embodiment (S14).

If it is determined at S14 that the damper D is accelerating, similarly to S5 in the above-described embodiment, the damper control device E acquires the control damper speed Vc from the damper speed Vd and the multiplication value k acquired at S12 so that the signs of the control damper speed Vc and the damper speed Vd accord with each other (S15). Alternatively, if it is determined at S14 that the damper D is decelerating, the damper control device E acquires the control damper speed Vc from the damper speed Vd and the deceleration multiplication value j acquired at S13 so that the signs of the control damper speed Vc and the damper speed Vd accord with each other in the multiplication unit 24e (S16).

Then, the damper control device E acquires the electric current value I and supplies the electric current to the damping force adjustment unit 4 similarly to S7 and S8 in the above-described embodiment (S17, S18).

Figure 12:
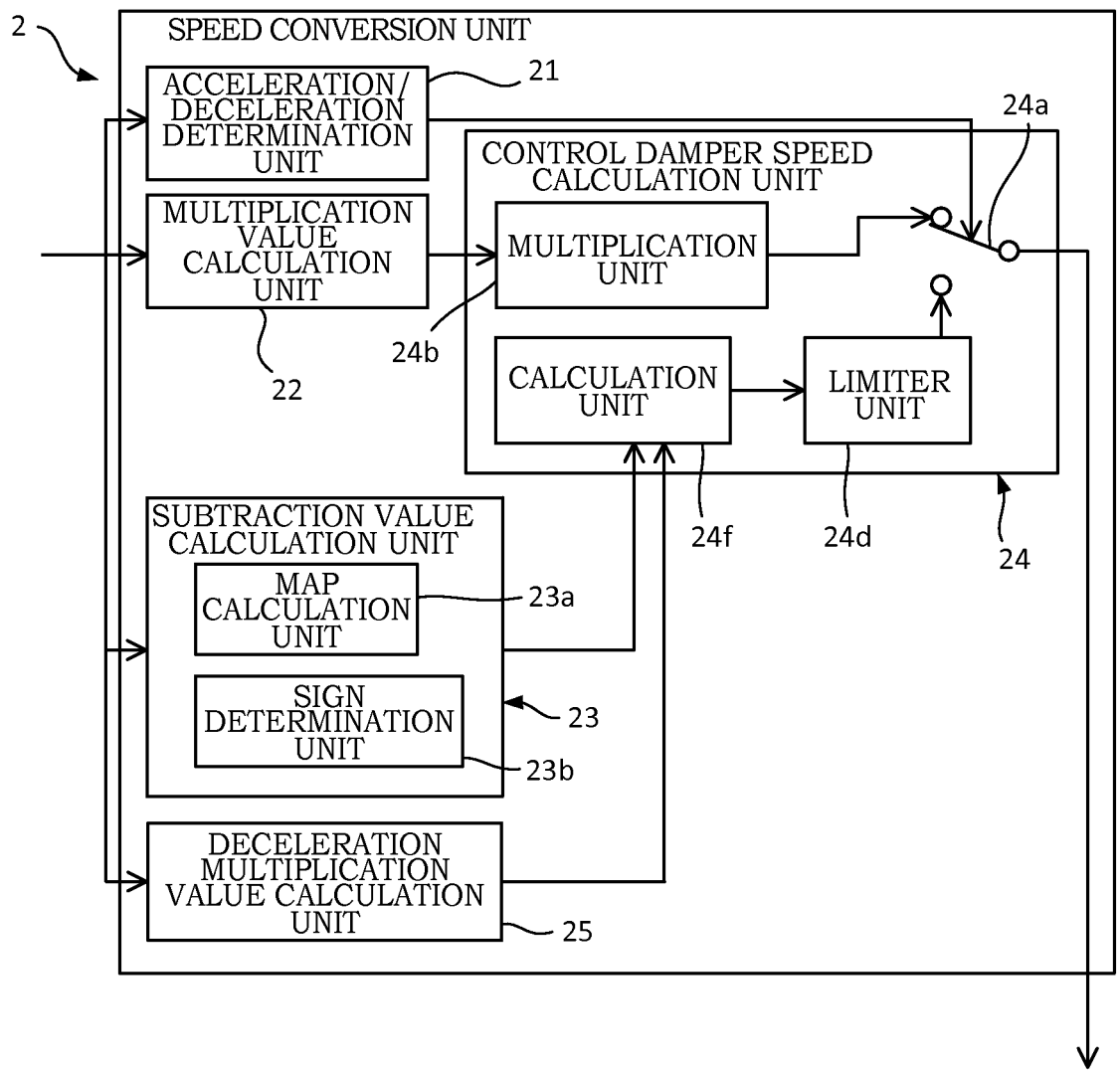
FIG. 12 is a diagram illustrating another variation of the damper control device.

Moreover, as the speed conversion unit 2 illustrated in FIG. 12, the deceleration multiplication value calculation unit 25 may be provided in addition to the deceleration value calculation unit 23, and a calculation unit 24f for acquiring the control damper speed Vc from the damper speed Vd, the subtraction value δ, and the deceleration multiplication value j may be provided instead of the deceleration unit 24c.

Figure 13:
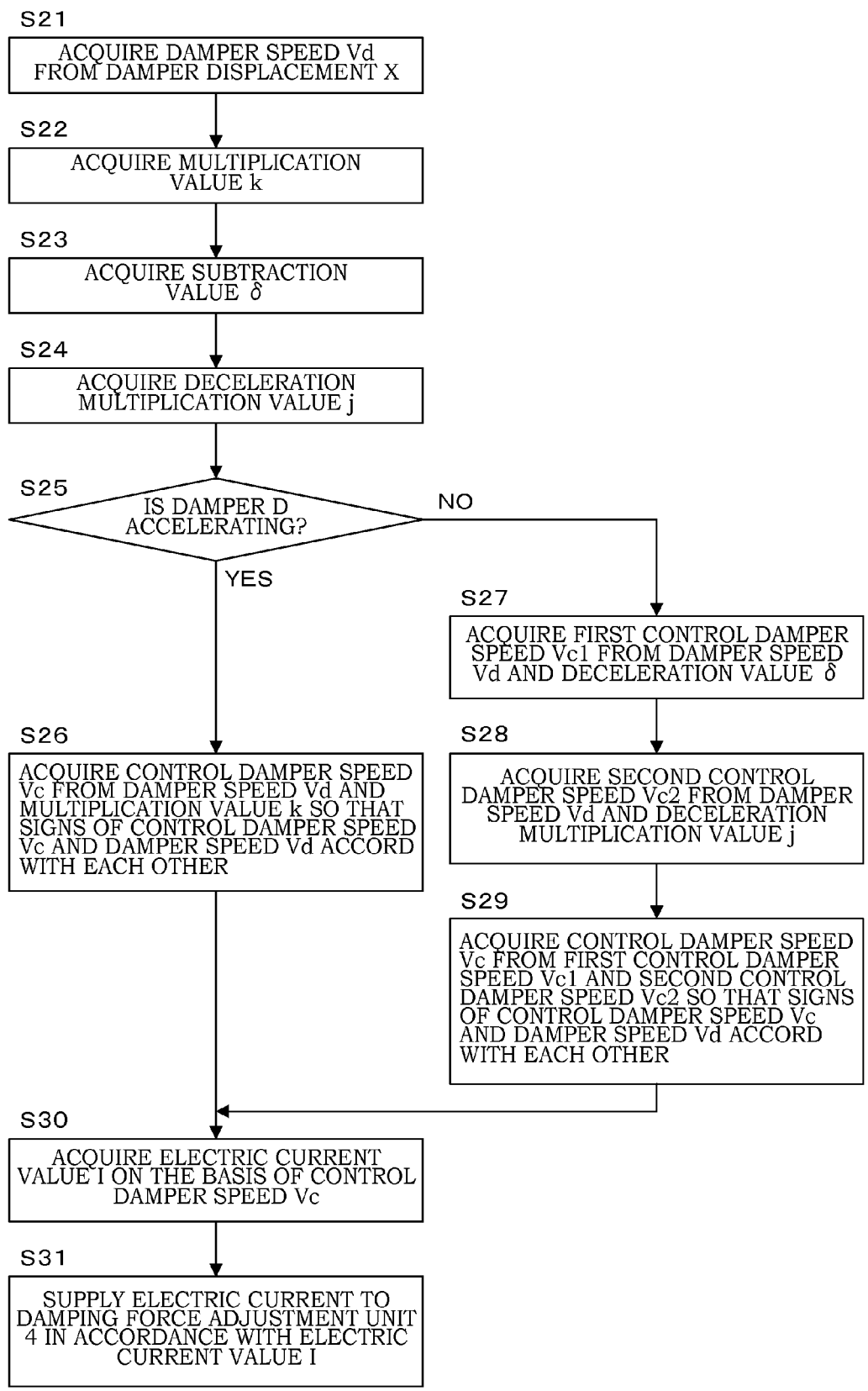
FIG. 13 is a flowchart illustrating a procedure of the control executed by the damper control device according to another variation.

In this case, the damper control device E executes control in a procedure illustrated in a flowchart in FIG. 13.

Specifically, first, the damper control device E acquires the damper speed Vd, the multiplication value k, and the subtraction value δ similarly to S1 to S3 in the above-described embodiment (S21 to S23). Moreover, similarly to S13 in the embodiment illustrated in FIG. 10, the deceleration multiplication value j is acquired (S24).

Subsequently, the damper control device E determines whether the damper D is accelerating or decelerating similarly to S4 in the above-described embodiment (S25).

If it is determined at S25 that the damper D is accelerating, the damper control device E acquires the control damper speed Vc from the damper speed Vd and the multiplication value k acquired at S22 so that the signs of the control damper speed Vc and the damper speed Vd accord with each other similarly to S5 in the above-described embodiment (S26). Alternatively, if it is determined at S25 that the damper D is decelerating, the subtraction value δ is subtracted from the damper speed Vd so as to acquire a first control damper speed Vc1 in the calculation unit 24f (S27), the deceleration multiplication value j is multiplied by the damper speed Vd so as to acquire a second control damper speed Vc2 (S28), and the control damper speed Vc is acquired from the first control damper speed Vc1 and the second control damper speed Vc2 so that the signs of the control damper speed Vc and the damper speed Vd accord with each other (S29).

In this case, either one of the first control damper speed Vc1 and the second control damper speed Vc2 may be employed as the control damper speed Vc to be used for control, for example, a value obtained by averaging the first control damper speed Vc1 and the second control damper speed Vc2 may be employed, or a value obtained by multiplying the both by a weight and adding up or the like may be employed.

Then, the damper control device E acquires the electric current value I and supplies the electric current to the damping force adjustment unit 4 similarly to S7 and S8 of the above-described embodiment (S30, S31).

Moreover, in acceleration of the damper D, instead of acquiring the control damper speed Vc by multiplying the damper speed Vd by the multiplication value k, it may be so configured that an addition value having one or more values is acquired, and the control damper speed Vc is acquired by adding the addition value to the damper speed Vd.

Moreover, as the result of conversion of the damper speed Vd to the control damper speed Vc when the damper speed Vd is decelerating, if the sign of the damper speed Vd and the sign of the control damper speed Vc are different from each other, the speed conversion unit 2 sets the control damper speed Vc to 0 but it may be set to a predetermined value with which the sign of the damper speed Vd accords. According to this, similarly to the case in which the control damper speed Vc is set to 0, when the damper D is decelerating and the damper speed Vd gets close to 0, such a situation can be prevented that the absolute value of the control damper speed Vc becomes larger with the sign of the control damper speed Vc reversed and the damping force generated by the damper D becomes larger. It is advantageous in reducing the hysteresis of the damping force if the predetermined value is set to a small value close to 0. Alternatively, the predetermined value may be a value changing in accordance with the damper speed Vd.

With respect to the above description, the contents of application No. 2013-091885, with a filing date of Apr. 25, 2013 in Japan, are incorporated herein by reference.

The invention claimed is:

1. A damper control device for controlling a damping force of a damper on the basis of a damper speed, the damper being interposed between a sprung member and an unsprung member in a vehicle, the damper control device comprising:
    a speed conversion unit that converts the damper speed to
        a control damper speed, wherein while the damper is accelerating, the speed conversion unit converts the damper speed so that signs of the control damper speed and the damper speed accord with each other and an absolute value of the control damper speed becomes an absolute value of the damper speed or more, and while the damper is decelerating, the damper speed is converted so that the signs of the control damper speed and the damper speed accord with each other and the absolute value of the control damper speed becomes the absolute value of the damper speed or less; and
    a control unit that controls the damping force of the damper by using the control damper speed acquired in the speed conversion unit.

2. The damper control device according to claim 1, wherein the speed conversion unit converts the damper speed on the basis of damper acceleration.

3. The damper control device according to claim 2, wherein the larger the damper acceleration is, the larger the speed conversion unit converts the damper speed.

4. The damper control device according to claim 1, wherein as the result of conversion of the damper speed to the control damper speed when the damper speed is decelerating, if the sign of the damper speed and the sign of the control damper speed are different from each other, the speed conversion unit sets the control damper speed to a predetermined value with which the sign of the damper speed accords or 0.

5. The damper control device according to claim 1, wherein the speed conversion unit is provided with an acceleration/deceleration determination unit,
    the acceleration/deceleration determination unit determines whether the damper is accelerating or decelerating, and
    if the acceleration/deceleration determination unit determines that the damper is decelerating, the control damper speed is acquired by subtracting a subtraction value from the damper speed.

6. The damper control device according to claim 1, wherein the speed conversion unit includes:
    an acceleration/deceleration determination unit that determines whether the damper is accelerating or decelerating;

a multiplication value calculation unit that acquires a multiplication value by which the damper speed is to be multiplied if the damper is accelerating;

a subtraction value calculation unit that acquires a subtraction value to be subtracted from the damper speed if the damper is decelerating; and a control damper speed calculation unit that acquires the control damper speed by multiplying the damper speed by the multiplication value when the acceleration/deceleration determination unit determines that the damper is accelerating and acquires the control damper speed by subtracting the subtraction value from the damper speed when the acceleration/deceleration determination unit determines that the damper is decelerating.

7. The damper control device according to claim 1, wherein the speed conversion unit includes:

an acceleration/deceleration determination unit that determines whether the damper is accelerating or decelerating;

a multiplication value calculation unit that acquires a multiplication value by which the damper speed is to be multiplied if the damper is accelerating;

a deceleration multiplication value calculation unit that acquires a deceleration multiplication value at 0 or more and 1 or less by which the damper speed is to be multiplied if the damper is decelerating; and a control damper speed calculation unit that acquires the control damper speed by multiplying the damper speed by the multiplication value when the acceleration/deceleration determination unit determines that the damper is accelerating and acquires the control damper speed by multiplying the damper speed by the deceleration multiplication value when the acceleration/deceleration determination unit determines that the damper is decelerating.

8. The damper control device according to claim 1, wherein the speed conversion unit includes:

an acceleration/deceleration determination unit that determines whether the damper is accelerating or decelerating;

a multiplication value calculation unit that acquires a multiplication value by which the damper speed is to be multiplied if the damper is accelerating;

a subtraction value calculation unit that acquires a subtraction value to be subtracted from the damper speed if the damper is decelerating;

a deceleration multiplication value calculation unit that acquires a deceleration multiplication value at 0 or more and 1 or less by which the damper speed is to be multiplied if the damper is decelerating; and a control damper speed calculation unit that acquires the control damper speed by multiplying the damper speed by the multiplication value when the acceleration/deceleration determination unit determines that the damper is accelerating, and acquires a first control damper speed by subtracting the subtraction value from the damper speed, acquires a second control damper speed by multiplying the damper speed by the deceleration multiplication value, and acquires the control damper speed on the basis of the first control damper speed and the second control damper speed, when the acceleration/deceleration determination unit determines that the damper is decelerating.

9. The damper control device according to claim 1, wherein if the damping force of the damper is to be controlled so that a damping coefficient when the damper speed is in a low-speed region becomes higher than the damping coefficient when it is in a high-speed region, the damping force of the damper is controlled by using the control damper speed.

10. A damper control method for controlling a damping force of a damper on the basis of a damper speed, the damper being interposed between a sprung member and an unsprung member in a vehicle, the damper control method comprising:

converting the damper speed to a control damper speed, wherein while the damper is accelerating, the damper speed is converted so that signs of the control damper speed and the damper speed accord with each other and an absolute value of the control damper speed becomes an absolute value of the damper speed or more, and while the damper is decelerating, the damper speed is converted so that the signs of the control damper speed and the damper speed accord with each other and the absolute value of the control damper speed becomes the absolute value of the damper speed or less; and controlling the damping force of the damper by using the control damper speed.

* * * * *